(12) United States Patent
Heiles

(10) Patent No.: US 7,020,094 B2
(45) Date of Patent: Mar. 28, 2006

(54) METHOD AND SYSTEM FOR TRANSMITTING AT LEAST ONE CLIENT SIGNAL WITHIN A SERVER SIGNAL

(75) Inventor: Juergen Heiles, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 957 days.

(21) Appl. No.: 09/880,176

(22) Filed: Jun. 13, 2001

(65) Prior Publication Data

US 2002/0024969 A1 Feb. 28, 2002

(30) Foreign Application Priority Data

Jun. 13, 2000 (DE) ......................... 100 29 063

(51) Int. Cl.
*G08C 15/00* (2006.01)
*H04Q 11/00* (2006.01)
*H04L 12/56* (2006.01)
*H04L 12/66* (2006.01)
*H04J 3/12* (2006.01)

(52) U.S. Cl. .................. 370/252; 370/358; 370/391; 370/463; 370/522

(58) Field of Classification Search ............... 370/358, 370/391, 403, 522, 252
See application file for complete search history.

(56) References Cited

U.S. PATENT DOCUMENTS 6,768,980 B1 * 7/2004 Meyer et al. ............... 704/500

FOREIGN PATENT DOCUMENTS

| DE | 227 019 A1 | 9/1984 |
| DE | 39 34 248 A1 | 10/1989 |
| EP | 0 926 851 A2 | 6/1999 |

OTHER PUBLICATIONS

ITU Recommendation G.707: Series G; Transmission Systems and Media.

* cited by examiner

*Primary Examiner*—Chi Pham
*Assistant Examiner*—Ronald Abelson
(74) *Attorney, Agent, or Firm*—Bell, Boyd & Lloyd LLC (57) ABSTRACT

A method and system for transmitting at least one client signal within a server signal which has a predetermined transmission bit rate, with the transmission bit rate of the client signal and the transmission bit rate of the server signal being different. To this end, at least one identification number, which indicates the transmission bit rate relationships, is determined for at least one client signal at the transmission end, and the data in the at least one client signal are inserted uniformly into the server signal via sigma-delta modulation and using the determined identification number. The server signal is transmitted with the determined identification number and, at the receiving end, the data in the at least one client signal is determined via sigma-delta modulation and using the transmitted identification number.

16 Claims, 4 Drawing Sheets

METHOD AND SYSTEM FOR TRANSMITTING AT LEAST ONE CLIENT SIGNAL WITHIN A SERVER SIGNAL

BACKGROUND OF THE INVENTION

1. Field of the Invention

The present invention relates to a method and system for transmitting at least one client signal within a server signal which has a predetermined transmission bit rate, with the transmission bit rate of the client signal and the transmission bit rate of the server signal being different.

2. Description of the Prior Art

Although modern digital transmission systems which, for example, use the synchronous digital hierarchy (SDH) or the plesiochronous digital hierarchy (PDH), support different client signals in terms of the respective transmission rate and the respective transmission protocol, specific transmission-rate and transmission-protocol-specific processing steps are required to transmit the respective client signals. To do this, it is necessary to modify or convert the transmission units in the digital transmission system for transmitting client signals which have different transmission rates.

In digital transmission systems which have been implemented so far, digital server signals having a variable bit rate are provided which are coupled to the bit rate of the client signal to be transmitted; the transmission signal from a customer in the transmission system. Furthermore, digital transmission signals have a constant bit rate, in particular the digital server signal, and have a frame structure having an overhead area and a payload area. The payload area is intended for transmitting client signals, and the overhead area contains control and monitoring information. The client signal thus occupies the entire signal area (payload area) of the server signal. If the bit rate in the client signal changes, the bit rate of the server signal is appropriately modified or adapted. If the server signal does not have the transmission rate required for the client signal to be transmitted, it is normally necessary to modify or to reconfigure individual transmission units in the digital transmission system to do this. Such methods and arrangements are referred to in specialist circles by the term "digital rapper".

For high transmission rates, for example in optical transmission systems, the range of bit rates which can be transmitted in the server signal is highly restricted owing both to technical implementation problems and for cost reasons. If the client signal bit rate varies, then the bit rate or transmission rate of the server signal is matched to it, requiring replacement or adaptation of all those components which are sensitive to the bit rate within the optical transmission system; for example, 3-R regenerators and clock recovery devices.

Furthermore, a mapping scheme is known from ITU-T Recommendation G.707, which defines the mapping of 34 Mbit/s and 45 Mbit/s PPH signals onto an SDH-VC-3-signal. A digital server signal is provided for this purpose, which has a constant bit rate and onto whose payload area the client signal is mapped. The payload area in the server signal is filled more or less effectively depending on the client signal bit rate. Fixed stuffing positions, flexible stuffing positions and fixed client data positions are defined for the mapping scheme in the ITU-T Recommendation G.707, resulting in a specific mapping scheme for each client signal having a different bit rate. Although the described method envisages a constant bit rate for the server signal, a mapping scheme defined by an ITU-T-Standard is, however, required for each client signal in order to ensure interworking between the communications units and transmission units from different manufacturers. The interfaces between the client signal which has a variable bit rate and the server signal which has a fixed bit rate must, for this purpose, be matched to a mapping scheme.

An object to which the present invention is directed is to improve the transmission of client signals which have a variable transmission rate within a server signal which has a constant transmission rate.

SUMMARY OF THE INVENTION

According to the present invention, therefore, at a transmission end, at least one identification number, which indicates the transmission bit rate relationships, is determined for at least one client signal, and the data in the at least one client signal is inserted uniformly into the server signal via sigma-delta modulation and using the determined identification number. Furthermore, the server signal is transmitted with the determined identification number and, at the receiving end, the data in the at least one client signal is determined from the transmitted server signal via sigma-delta modulation and using the transmitted identification number. The present invention describes a method that supports a server signal, which has a constant predetermined transmission bit rate, for transmitting client signals which have different transmission bit rates. That is, according to the present invention, the transmission bit rates of the client signal and of the server signal are used to determine the number of client signal data items which can be transmitted in each server frame within the payload area of the server signal. The determined number of data items is supplied as the identification number to a sigma-delta modulator, which produces a client bit control signal for virtually uniform distribution of the client data over, for example, the entire payload area of the server signal. The identification number which is determined in the insertion point is also transmitted with the respective server frame to the removal point, where it is supplied to a further sigma-delta modulator which produces a client bit control signal for removing the client data from the entire payload area of the server signal. This allows client signals having different transmission bit rates to be transmitted in a particularly advantageous manner via a server signal having a constant transmission rate, and without having to provide any manual settings or circuit modifications at the insertion and removal points. Furthermore, the virtually uniform distribution of the client data over the server signal reduces the jitter/wandering behavior and reduces the memory capacity of the buffer memory units which have to be provided both in the insertion point and in the removal point, thus allowing cost-effective transmission of a number of client signals in one server signal.

The server signal advantageously has a frame structure with each frame being subdivided into an overhead area and a payload area, and the determined identification number being transmitted in the overhead area of the server signal. The overhead area is thus provided in a particularly advantageous manner for transmitting the respective identification number. Furthermore, the transmission of the identification number in the overhead area of the server signal advantageously ensures that the identification number is determined at the right time in the removal point via the evaluation (which normally has precedence in time) of the overhead area before the payload area of the server frame.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
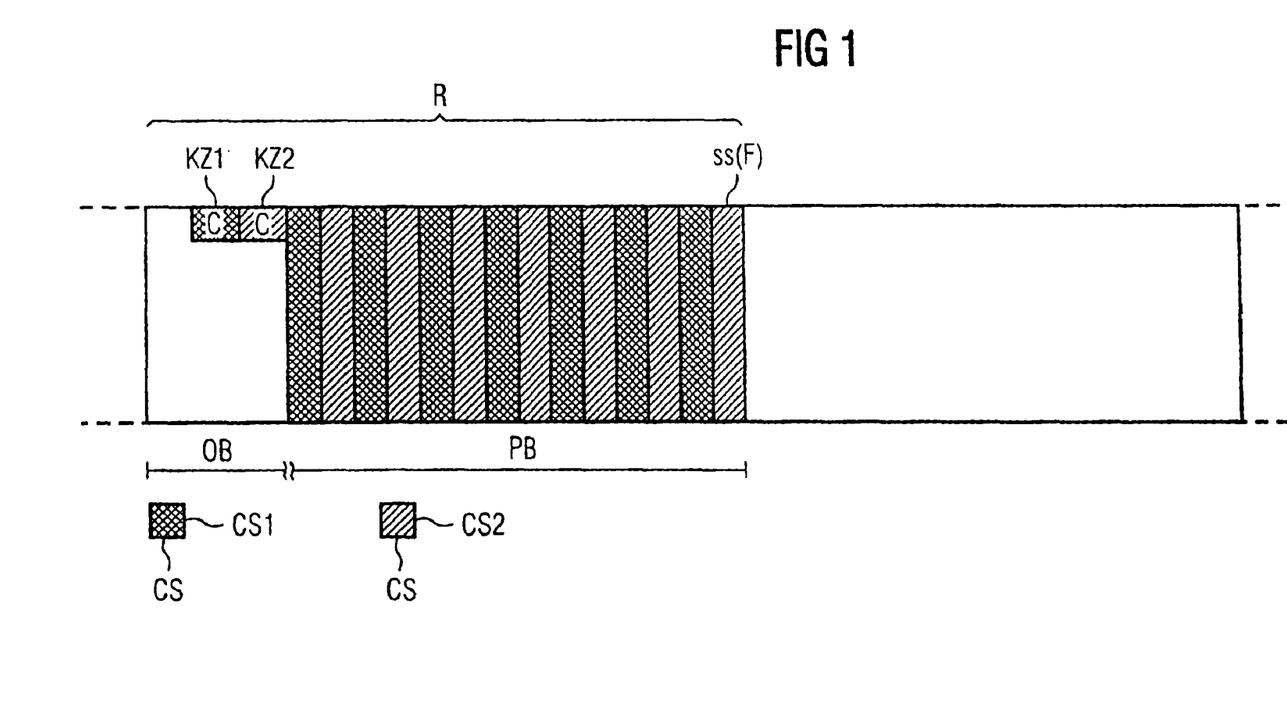
FIG. 1 shows the basic construction of a digital server signal.

By way of example, FIG. 1 shows a digital server signal ss whose bit rate is F and which has a frame structure including an overhead area OB and a payload area PB. The payload area PB is intended for transmitting the various client signals CS1, CS2; that is, the data of the first client signal CS1 and of the second client signal CS2 are inserted into the payload area PB of the server signal ss. The associated identification numbers KZ1, KZ2 are inserted in the overhead area OB of the server signal ss. In the exemplary embodiment illustrated in FIG. 1, a first identification number KZ1 and a second identification number KZ2 are inserted, by way of example, into the overhead area OB of the server signal ss. The payload area PB of the server signal ss includes P bits, and the overhead area OB of the server signal ss is formed from O bits. The overall frame of the server signal ss, including the overhead area OB and the payload area PB, thus has P+0 bits. For a client bit rate f, or for the bit rate of the respective client signal CS1, CS2, it is necessary to insert a number c=f/F*(P+0) of client bits into the payload area OB for each server frame R, and to transmit this within the payload area OB. Since, of course, integer bits can be transmitted only once, the integer component of the determined number of c clients bits C is, in each case, used for further processing. The error resulting from this is corrected by, for example, increasing the integer component of the c client bits C by a count value when transmitting the next server frame R, and by using this value for further processing.

By way of example, the respective integer number of client bits C1, C2 can, according to the present invention, be chosen as the first and the second identification number KZ1, KZ2; i.e., the respective identification number KZ1, KZ2 indicates the number of client bits C1, C2 which can be transmitted in the payload area PB. If there are a number of client signals CS, in particular in the case of a first and a second client signal CS1, CS2 as indicated in FIG. 1, each individual client signal CS1, CS2 is allocated a specific section of the payload area PB in the server frame R, in that the data or the data bits of the first and of the second client signal CS1, CS2 are transmitted.

Figure 2:
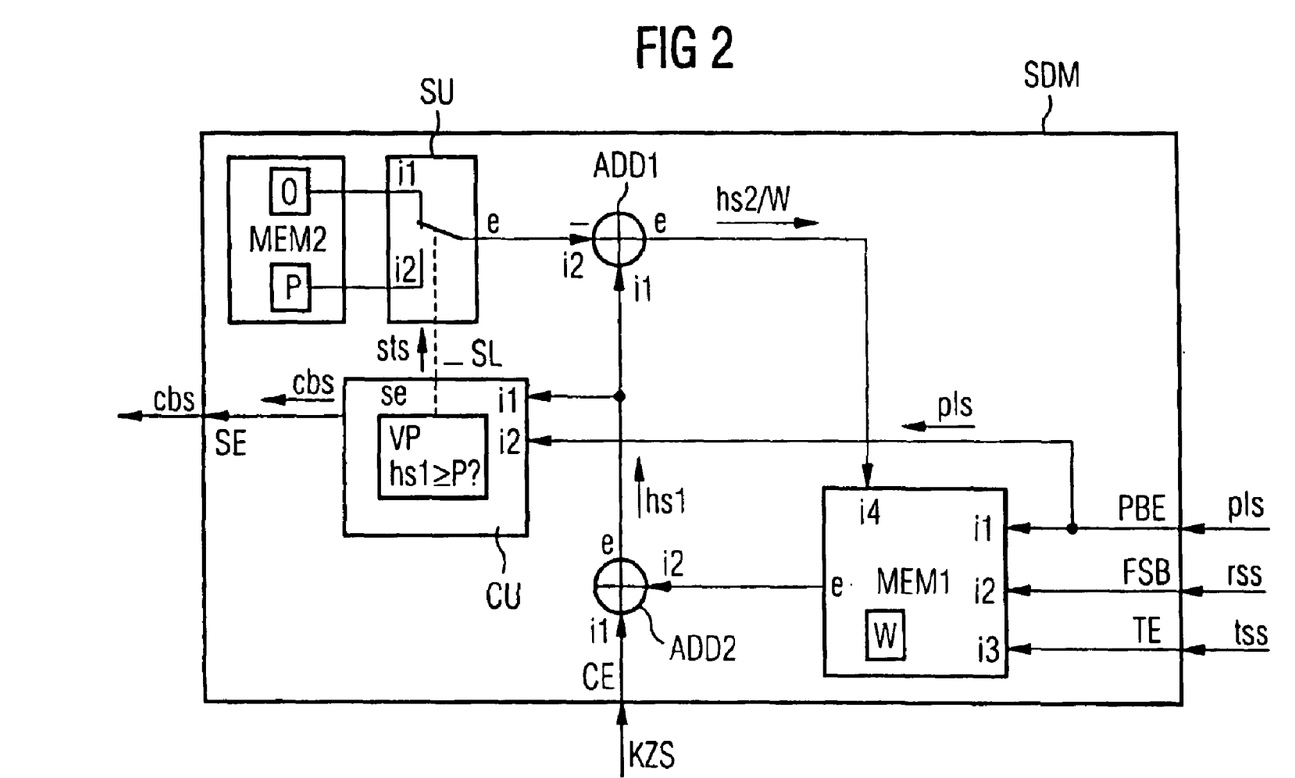
FIG. 2 uses an outline circuit diagram to show a sigma-delta modulator for carrying out the method according to the present invention.

FIG. 2 uses an outline circuit diagram to illustrate, by way of example, a sigma-delta modulator SDM for carrying out the method according to the present invention, which has a first and a second memory unit MEM1, MEM2, a first and a second adder ADD1, ADD2 together with a switching unit SU and a comparison unit CU. Furthermore, the sigma-delta modulator SDM has a payload input PBE, a frame start input FSB, a clock input TE, an identification number input CE and a client bit control output SE. The identification number input CE is connected to the first input i1 of the second adder ADD2. Furthermore, the output e of the second adder ADD2 is connected to the first input i1 of the comparison unit CU, and to the first input i1 of the first adder ADD1. The second input i2 of the second adder ADD2 is connected to the output e of the first memory unit MEM1. The payload input PBE, the frame start input FSB and the clock input TE are connected respectively to the first, second and third inputs i1, i2, i3 of the first memory unit MEM1.

Furthermore, the fourth input i4 of the first memory unit MEM1 is connected to the output e of the first adder ADD1. The output e of the switching unit SU is connected to the second input i2 of the first adder ADD1. In addition, the switching unit SU is connected via a control line SL to the control input se of the comparison unit CU. The first input i1 of the switching unit SU is connected to the second memory unit MEM2, and a logic zero signal 0 is produced, which is stored in the second memory unit MEM2. The second input i2 of the switching unit SU is connected to the second memory unit MEM2, in which the number P of payload bits is saved or stored. Finally, the payload input PBE is connected to the second input i2 of the comparison unit CU.

The clock of the server signal or the server clock signal tss is applied to the clock input TE of the sigma-delta modulator SDM, and is transmitted to the first memory unit MEM1. The value W at the input i4 is then read to the first memory unit MEM1, using the clock of the server signal tss, provided the payload signal pls supplied to the first memory unit MEM1 via the payload input PBE is active. Furthermore, using the frame start signal rss which is applied to the frame start input FSB, the sigma-delta modulator SDM is told when a new frame R is starting within the server signal ss. The frame start signal rss is transmitted to the first memory unit MEM1 for this purpose. Furthermore, the start of a server frame R in the server signal ss is indicated by the frame start signal rss to the sigma-delta modulator SDM, thus setting a value W which is stored in the first memory unit MEM1 to the value 0; i.e., the memory contents W are deleted.

A payload signal pls is applied to the payload input PBE of the sigma-delta modulator SDM and is transmitted to the first memory unit MEM1 and to the comparison unit CU. The payload signal pls indicates the payload area PB within a server frame R in the server signal ss, that is to say the payload signal pls is active while the payload area PB is actually being transmitted. In addition, the payload signal pls starts a comparison procedure VP in the comparison unit CU. The value W to be stored in the first memory unit MEM1 is transmitted from the first adder ADD1 to the fourth input i4 of the first memory unit MEM1, where it is stored using the clock of the server signal tss during the transmission of the payload area PB. The value W is produced, for example in a constant manner, at the output e of the first memory unit MEM1, and is transmitted to the second input i2 of the second adder ADD2.

Furthermore, the identification number signal kzs which is applied to the identification number input CE, and hence the identification number KZ, are transmitted via the identification number input CE of the sigma-delta modulator SDM to the first input i1 of the second adder ADD2. The second adder ADD2 is used to add the identification number signal kzs or the identification number KZ and the value W in the first memory unit MEM1, and to transmit the result of the addition process, which is combined in a first auxiliary signal hs1, via the output e of the second adder ADD2 to the first input i1 of the first adder ADD1, and to the first input i1 of the comparison unit CU.

The comparison procedure VP in the comparison unit CU is used to compare the first auxiliary signal hs1, which is produced from the addition of the identification number KZ and the value W, with the value P which is stored in the second memory unit MEM2 and indicates the number of bits in the payload area PB, and the comparison result is used to produce a control signal sts in the comparison unit CU, which is transmitted via the control line SL to the switching unit SU. The control signal sts is used in the switching unit SU to connect either the first input i1 or the second input i2 to the output e of the switching unit SU. In FIG. 2, by way of example, there is no signal or the logic 0 value is present at the first input i1, and the value for the number of bits P included in the payload area is applied to the second input i2. The signal selected via the switching unit SU, or the selected value 0 or P, is transmitted to the second input i2 of the first adder ADD1, with a negative mathematical sign being allocated within the first adder ADD1 to the signal applied to the second input i2 of the adder ADD1, or to the applied value O or P for the addition. The value 0 or P, which has a negative mathematical sign, is now added to the first auxiliary signal hs1 in the first adder ADD1, and a second auxiliary signal hs2 is produced. The second auxiliary signal, or the value of the second auxiliary signal hs2, represents the new value W which is to be stored in the memory unit and, thus, is transmitted from the output e of the first adder ADD1 to the fourth input i4 of the first memory unit MEM1, in which it is stored.

A client bit control signal cbs is emitted at the client bit control output se of the comparison unit CU, the signal having been produced in advance on the basis of the comparison result between the first auxiliary signal hs1 or the first auxiliary value hs1 and the number of payload bits P or the number of bits P in the payload area OB, using the comparison procedure VP. Furthermore, the comparison procedure VP is carried out to produce both the client bit control signal PBS and the control signal SPS at the time at which the payload signal pls which is transmitted from the payload input PBE indicates to the comparison unit CU that the payload area PB is being considered with the current data transmission status. According to the sigma-delta modulator SDM illustrated in FIG. 2, the identification number signal or the identification number KZS is added, using the second adder ADD2, and at the time of each payload bit, to the memory contents W of the first memory unit MEM1 and to the value W in the first memory unit MEM1. The comparison procedure VP is also used in the comparison unit CU to confirm whether the number of payload bits P is less than or equal to the value of the first auxiliary signal hs1 or of the first auxiliary signal value hs1. If this is the case, then the comparison procedure VP is used to produce a client bit control signal cbs such that it is impossible to transmit a client bit at the payload bit position under consideration. If, for example, the bit rate P is less than or equal to the first auxiliary signal value hs1, then the control signal sts produced in the comparison unit CU is used to,drive the switching unit SU in such a manner that the value P of the number of payload bits is passed to the second input i2 and, using the first adder ADD1, this is subtracted from the first auxiliary signal hs1 or from the first auxiliary signal value hs1. The value of the subtraction or the result is then transmitted as the second auxiliary signal hs2 or the second auxiliary signal value hs2 from the output e of the first adder ADD1 to the fourth input i4 of the first memory device MEM1, where it is stored as the new memory value W.

In addition, an active client bit control signal cps is produced in the comparison unit CU using the comparison procedure VP and indicates that a client bit is intended to be transmitted at the payload bit position under consideration in the payload area PB. If the value P of the number of payload bits is greater than the first auxiliary signal value hs1, then the control signal sts produced in the comparison unit CU is used to drive the switching unit SU in such a manner that the value 0 is applied to the second input i2 and, using the first adder ADD1, this value is subtracted from the first auxiliary signal hs1 or from the first auxiliary signal value hs1. The result of the subtraction is then transmitted as the second auxiliary signal hs2 or the second auxiliary signal value hs2 from the output e of the first adder ADD1 to the fourth input i4 of the first memory unit MEM1, where it is stored as the new memory value, or value W. In addition, an inactive client bit control signal cps is produced in the comparison unit CU using the comparison procedure VP and indicates that no client bit is intended to be transmitted at the payload bit position under consideration in the payload area PB.

The sigma-delta modulator SDM according to the present invention is used to uniformly distribute the identification numbers Kz and the number of client bits C which can be transmitted in the payload area PB of the server signal ss over the payload area PB. This improves the jitter/wandering behavior of the transmission system, and advantageously reduces the memory capacity of the buffer memory that needs to be provided within the transmission system. When a new server frame R starts, which is indicated by the frame start signal rss from the first memory unit MEM1 or the sigma-delta modulator SDM, then, according to the present invention, the memory contents W are reset; that is, the memory contents W are deleted or are overwritten with the value 0.

Figure 3:
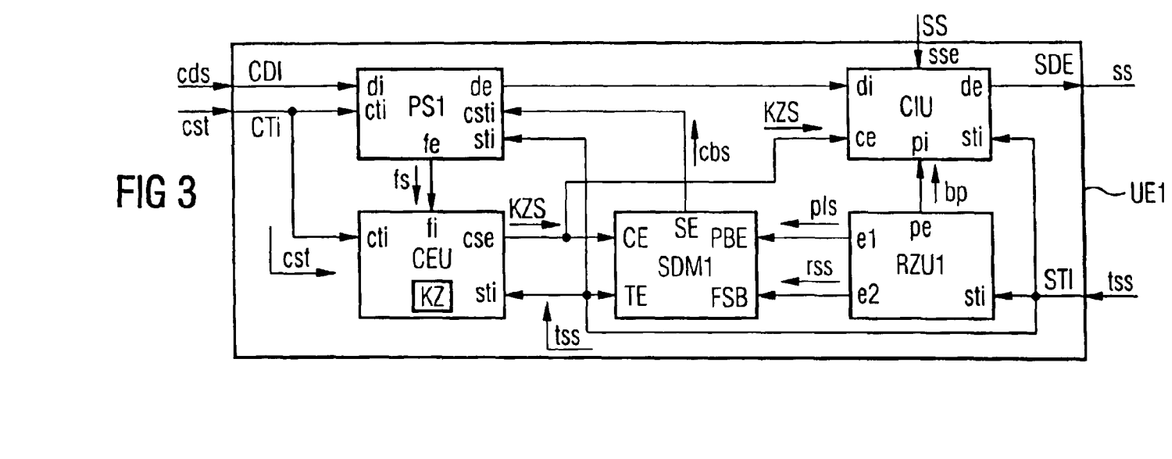
FIG. 3 shows a first transmission unit, arranged at a transmission end.

By way of example, FIG. 3 uses an outline circuit diagram to show the first transmission unit UE1 according to the present invention, in particular a transmitting unit, which has a first buffer memory unit PS1, an identification number determination unit CEU, a first sigma-delta modulator SDM1, for example the sigma-delta modulator SDM illustrated in FIG. 2, a first frame counter unit RZU1, and an identification number insertion unit CIU. The first buffer memory unit PS1 has a data input di, a data output de, a filling level output fe, a client clock input cti, a server clock input sti and a client bit control input csti. The identification number determination unit CEU has a client clock input cti, a filling level input fi, an identification number signal output cse and a server clock input sti. Furthermore, the identification number input insertion unit CIU has a data input di, a positioning output pi, a data output de, an identification number input ce and a server clock input sti. Analogously to the description relating to FIG. 2, the first sigma-delta modulator SDM1 has an identification number input CE, a server clock or clock input TE, a client bit control output SE, a payload input PBE and a frame start input FSB. The first frame counter unit RZU1 has a first output e1, a second output e2, a server clock input sti and a positioning output pe. Furthermore, the first transmission unit UE1 has a client data input CDI, a client clock input CTI, a server data output SDE and a server clock input STI.

The client data input CDI of the first transmission unit UE1 is connected to the data input di of the first buffer memory unit PS1. Furthermore, the client clock input CDI is connected to the client clock input cti of the first buffer memory unit PS1, and to the client clock input cti of the identification number determination unit CEU. The server data output SDE is connected to the data output de of the identification number insertion unit CIU. The server clock input STI of the first transmission unit UE1 is connected to the server clock input sti of the identification number insertion unit CIU, of the first frame counting unit RZU1 and of the identification number determination unit CEU, and of the first buffer memory unit PS1, as well as being connected to the clock input TE of the first sigma-delta modulator SDM1. The data output de of the first buffer memory unit PS1 is connected to the data input di of the identification number insertion unit CIU. Furthermore, the identification number output cse of the identification number determination unit CEU is connected to the identification number input CE of the first sigma-delta modulator SDM1 and to the identification number input ce of the identification number insertion unit CEU. The first and the second outputs e1., e2 of the first frame counter unit RZU1 are connected to the payload input PBE and to the frame start input FSB, respectively, of the first sigma-delta modulator SDM1. The client bit control output SE of the first sigma-delta modulator SDM1 is connected to the client bit control input csti of the first buffer memory unit PS1, and the filling level output fe of the first buffer memory unit PS1 is connected to the filling level input fi of the identification number determination unit CEU.

The client data signal cds is received at the client data input CDI of the first transmission unit UE1, and the client signal clock cst is received at the client clock input CTI. The client signal or client data signal cds is transmitted from the client data input CDI to the data input di of the first buffer memory unit PS1, and is buffer-stored in the buffer memory unit PS1. Furthermore, the client signal clock cts, which is applied to the client clock input CTI of the first transmission unit UE1, is transmitted to the first buffer memory unit PS1 and to the identification number determination unit CEU. In addition, the server clock signal tss which is applied to the server clock input STI is transmitted to the identification number insertion unit CEU, to the first frame counter unit RZU1, to the first sigma-delta modulator SDM1, to the identification number determination unit CEU and to the first buffer memory unit DS1. The client data stored in the first buffer memory unit PS1 is used to determine the filling level of the first buffer memory and of the first buffer memory unit PS1, and to produce a filling level indication signal fs in the first buffer memory unit PS1, and to transmit this via the filling level output fe to the filling level input fi of the identification number determination unit CEU. In the identification number determination unit CEU, the filling level indication signal fs in both the client clock signal cti and in the server clock signal sti are used to calculate or determine the identification number KZ according to the present invention. In this case, for example, the ratio of the client bit rate f to the server bit rate F multiplied by the sum of the bits in the overhead area OB and in the payload area PB is used to determine, approximately, the identification number KZ resulting in an identification number KZ which has an integer component. To determine the identification number KZ exactly, the filling level indication signal fs, for example, is evaluated, with an excessively high filling level of the first buffer memory unit PS1 resulting in the identification number KZ being increased, and an excessively low filling level in the first buffer memory unit PS1 resulting in the identification number KZ being reduced.

The identification number KZ or the identification number signal kzs determined in this way is transmitted to the identification number input CE of the first sigma-delta modulator SDM1, and to the identification number input ce of the identification number insertion unit CIU. In the first sigma-delta modulator SDM1 according to the present invention, the identification number signal kzs evaluated in the first sigma-delta modulator SDM1 is used, as described in the exemplary embodiment relating to FIG. 2, to determine a client control bit signal cbs, which is produced at the client bit output SE of the first sigma-delta modulator SDM1, and is supplied to the client bit control input csti of the first buffer memory unit PS1. The client bit control signal cbs is used to control whether a client bit (which is stored in the first memory unit PS1) in the client signal cds is or is not inserted into the bit position in the payload area PB currently under consideration. This method according to the present invention is used for approximately uniform distribution of the client bits or of the number of client bits indicated, for example, by the identification number KZ over the entire payload area PB. The payload area PB of the server signal ss filled in this way is transmitted to the identification number insertion unit CIU. In the identification number insertion unit CIU, the identification number KZ is inserted, preferably in the overhead area OB, into the server signal ss which is supplied via a server signal input sse to the identification number insertion unit CIU, and the server signal ss is transmitted from the data output de of the identification number insertion unit CIU to the server data output SDE of the first transmission unit UE1. The payload area signal pls and frame start rss required to provide or produce the client bit control signal cbs in the first sigma-delta modulator SDM1 are produced using the first frame counter unit RZU1 and the server clock signal tss, and are applied to the payload input PBE and to the frame start input FSB of the first sigma-delta modulator SDM1. In addition, the bit position bp of the identification number KZ which can be inserted, by way of example, into the overhead area OB of the server signal ss is determined in the first frame counter unit RZU1, and is transmitted via the positioning output pe to the positioning input pi of the identification number insertion unit CIU.

The server signal ss is transmitted with the identification number KZ inserted via, for example, an optical fiber OF (not shown in FIG. 3) to a second transmission unit UE2, for example a receiving unit.

Figure 4:
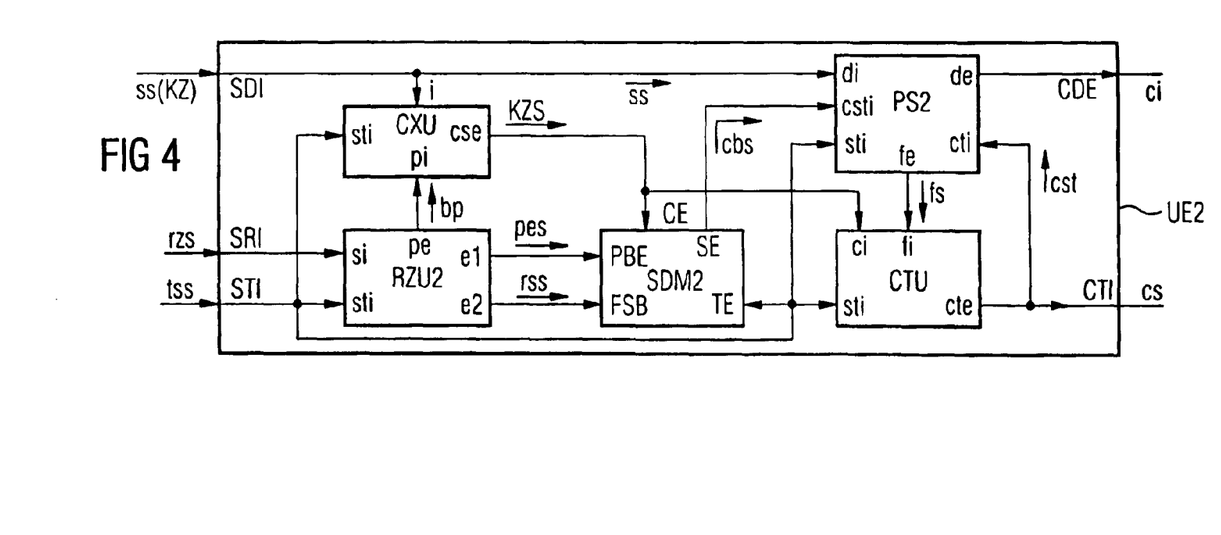
FIG. 4 shows a second transmission unit, arranged at a receiving end.

By way of example, FIG. 4 shows an outline circuit diagram of a second transmission unit UE2, in particular a receiving unit, which has a second buffer memory unit PS2, an identification number removal unit CXU, a second frame counter unit RZU2, a second sigma-delta modulator SDM2 and a client clock determination unit CTU. The second buffer memory unit PS2 has a data input di, a data output de, a client bit control input csti, a server clock input sti, a client clock input cti and a filling level output fe. Furthermore, the client clock determination unit CTU has a filling level input fi, an identification number input ci, a server clock input sti and a client clock output cte. The second sigma-delta modulator SDM2 is equipped, analogously to the first sigma-delta modulator SDM1 illustrated in FIG. 3, with an identification number input CE, a client bit control output SE, a server clock input TE, a payload input PBE and a frame start input FSB. The second frame counter unit RZU2 has a first output e1 and a second output e2, as well as a positioning output pe, a control input si and a server clock input sti. A server clock input sti, an input i, a positioning input pi and an identification number output cse are provided in the identification number removal unit CXU. The second transmission unit UI2 has a server data input SDI, a clock input SRI, a server clock input STI as well as a client data output CDE and a client clock output CTI.

The input i of the identification number removal unit CXU and the data input di of the second buffer memory unit PS2 are connected to the server data input SDI. The client data output CDE is connected to the data output de of the second buffer memory unit PS2. Furthermore, the control clock input STI is connected to the control input si of the second frame counter unit RZU2 and to the server clock input sti of the second frame counter unit RZU2, with the server clock input STI also being connected to the server clock INPUT sti of the identification number removal unit CXU, to the clock input TE of the second sigma-delta modulator SDM2, to the server clock input sti of the client clock determination unit CTU, and to the server clock input sti of the second buffer memory unit PS2.

The identification number signal output cse of the identification number removal unit CXU is connected to the identification number input CE of the second sigma-delta modulator SDM2. The first output e1 and the second output e2 of the second frame counter unit RZU2 are connected respectively to the payload input PBE and to the frame start input FSB of the second sigma-delta modulator SDM2. Furthermore, the second sigma-delta modulator SDM2 is connected via the client bit control output SE to the client bit control input csti of the second buffer memory unit PS2. The filling level of the second buffer memory unit PS2 is transmitted via the filling level output fe of the second buffer memory unit PS2 to the filling level input fi of the client clock determination unit CTU. Furthermore, the client clock output cte of the client clock determination unit CTU is connected to the client clock input cti of the second buffer memory unit PS2.

The server signal ss received at the server data input SDI is transmitted to the identification number removal unit CXU and to the data input di of the buffer memory unit PS2, and is buffer-stored in the second buffer memory unit PS2. The identification number removal unit CXU is used to read the identification number KZ or the identification number signal KZS at that bit position bp in the server signal ss determined by the second frame counter unit RZU, and this is transmitted from the identification number signal output CSE to the identification number signal input CE of the second sigma-delta-modulator SDM2, that is to say the current identification number KZ for the bit positions in the payload area PB, which are being considered at that time is available in the second sigma-delta modulator SDM2.

The transmission of the identification number KZ from the first transmission unit UE1 to the second transmission unit UE2 is used for synchronization of the first and second sigma-delta modulators SDM1, SDM2, that is to say the first sigma-delta modulator SDM1, which is arranged in the first transmission unit UE1, is operated in synchronism with the second sigma-delta modulator SDM2, which is arranged in the second transmission unit UE2. For this purpose, according to the present invention, each frame is allocated the identification number KZ, and this identification number KZ is also transmitted from the first transmission unit UE1 to the second transmission unit UE2 and, in the second transmission unit U12 (see FIG. 4) is controlled with the aid of the second sigma-delta modulator SDM2 in order to remove the client data or the client signal cds from the server signal ss.

A frame counter control signal rse is applied to the control input SRI of the second transmission unit UE2, and is transmitted to the control input si of the second frame counter control unit RZU2. Furthermore, the server clock signal tss is received at the server clock input STI of the second transmission unit UE2, and is applied to the server clock input sti of the identification number removal unit CXU, to the server clock input sti of the second frame counter unit RZU2, to the server clock input sti of the client clock determination unit CTU, to the server clock input sti of the second buffer memory unit PS2 and to the clock input TE of the second sigma-delta modulator SDM2. The payload signal pls and the frame start signal rss produced in the second frame counter unit RZU2 are transmitted from the first output e1 and from the second output e2, respectively, of the second frame counter unit RZU2 to the payload input PBE and to the frame start input fsb, respectively, of the second sigma-delta modulator SDM2. In addition, the bit position bp of the identification number KZ which, for example, is inserted in the overhead area OB of the server signal ss is determined in the second frame counter unit RZU2 and is transmitted via the positioning output pe to the positioning input pi of the identification number removal unit CXU.

Furthermore, according to the present invention, the second sigma-delta modulator SDM2 produces a client bit control signal cbs which is transmitted to the client bit control input csti of the second buffer memory unit PS2 in order to control the removal of the client bits from the server signal ss which is stored in the second buffer memory unit PS2. Furthermore, the client signal clock cst is recovered by the client clock determination unit CTU and with the identification number KZ or the identification number signal KZS being evaluated, as well as the filling level signal fs which is produced and transmitted by the second buffer memory unit, and taking account of the server clock signal tss, and this client signal clock cst is transmitted to the client clock output CTI of the second transmission unit UE2 and to the client clock input cti of the second buffer memory unit PS2.

Depending on the client bit control signal cbs determined by the second sigma-delta modulator SDM2, the client bit at the present bit position in the payload area PB of the server signal ss is removed in the second memory unit PS2 and, for example, the removed client bits are combined to form the original client signal cds, which is passed via the data output de of the second buffer memory unit PS2 to the client data output CDE of the second transmission unit.

In order to insert a number of client signals CS1, CS2 into the payload area PB of the server signal ss as claimed in the present invention, an arrangement as shown in FIGS. 3 and 4, that is to say a first transmission unit UE2 and a second transmission unit UE2, must be provided for each client signal. In this case, each client signal CS1, CS2 is allocated a section of the payload area PB which can be selected individually, and via which the data in the respective client signal are distributed virtually uniformly using the respective sigma-delta modulator SDM.

Furthermore, the identification number KZ for transmission is protected by a security mechanism, that is to say, for example, the identification number KZ can be encrypted at the receiving end within the server signal ss before being transmitted, or a check sum can be formed and also transmitted. The identification number KZ encrypted in such a way is decrypted at the receiving end before it is processed any further, or error-free transmission of the identification number KZ is checked using the check sum that is also transmitted (not shown in FIGS. 1 to 4).

If the transmission bit rates are high, the client data signal cds or the server signal ss is not processed in bit-serial form but in n-bit parallel form in the respective first and second transmission units UE1, UE2 which are arranged at the transmission end and receiving end respectively. That is, n bits of the client data signal cds or of the server signal ss are processed further at the same time in one server clock cycle.

This allows the processing clock rate in the first and second transmission units UE1, UE2 to be reduced by the factor n.

Figure 5:
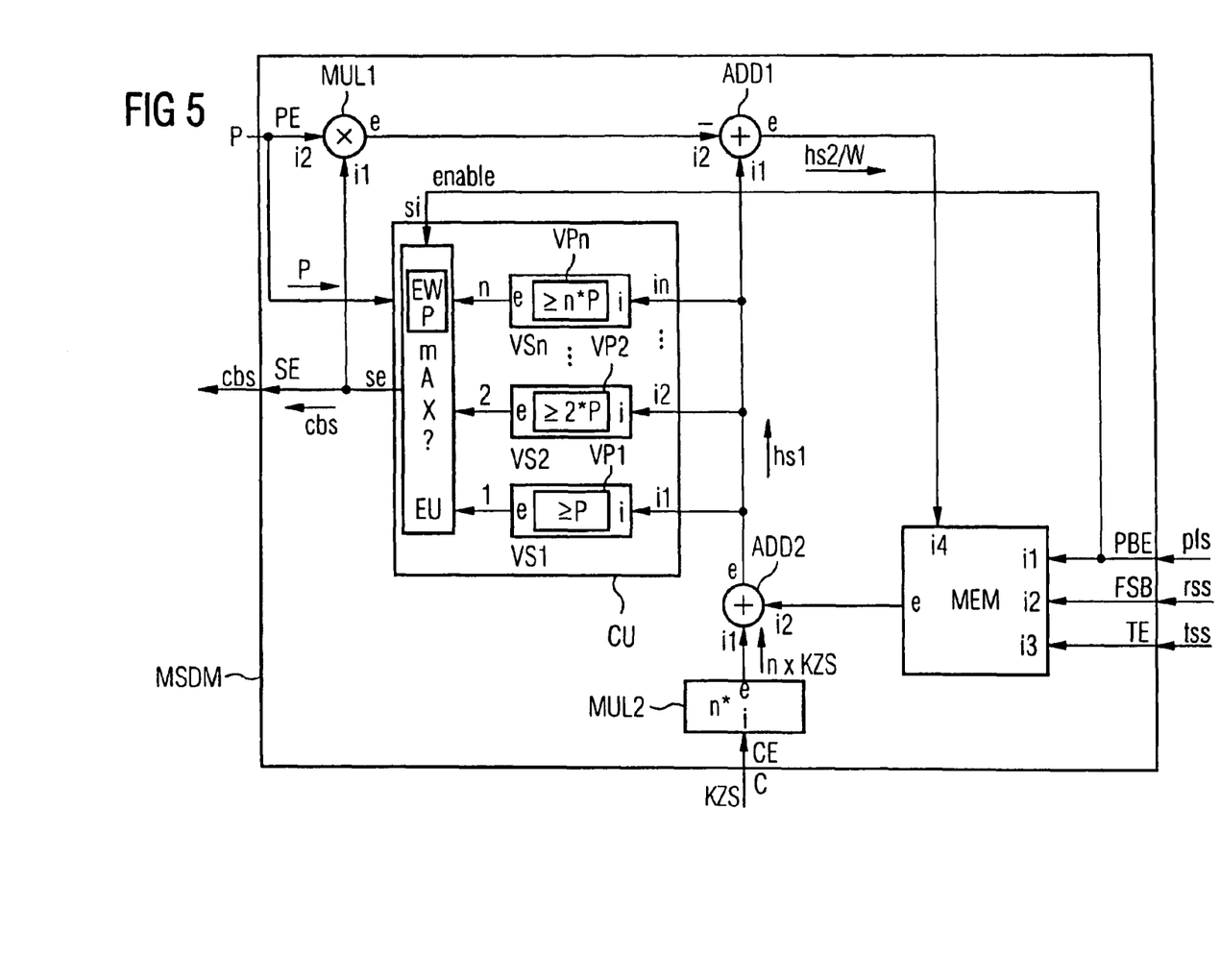
FIG. 5 uses a further outline circuit diagram to show a modified sigma-delta modulator for carrying out the method according to the present invention for n-bit parallel data processing.

In order to process such n-bit parallel data structures, for example n=8→1 byte, in the first and second transmission units UE1, UE2, a modified sigma-delta modulator MSDM is required, whose outline circuit diagram is shown, by way of example, in FIG. 5. The modified sigma-delta modulator MSDM according to the present invention has a memory unit MEM, a first and a second adder ADD1, ADD2, a first and a second multiplier MUL1, MUL2, and a comparison unit CU, with one to n-th comparison stages VS1 to VSn and an extreme-value determination unit EU being arranged in the comparison unit CU. The modified sigma-delta modulator MSDM according to the present invention has a payload bit input PE, a payload area input PBE, a frame start input FSB, a clock input TE, an identification number input KE and a client bit control output SE.

The identification number input KE is connected to the input i of the second multiplier MUL2, and the output e of the second multiplier MUL2 is connected to the first input i1 of the second adder ADD2, whose second input i2 is connected to the output e of the memory unit MEM. The output e of the second adder ADD2 is connected to each of the first to the n-th inputs i1 to in of the comparison unit CU, and is connected to the first input i1 of the first adder ADD1. The second input i2 of the first adder ADD1 is connected to the output e of the first multiplier MUL1, and the output e of the first adder ADD1 is connected to the fourth input i4 of the memory unit MEM. The first, second and third inputs i1, i2, i3 of the memory unit MEM are connected to the payload area input PBE, to the frame start input FSB and to the clock input TE. Furthermore, the payload area input PBE is connected to the control input si of the comparison unit CU. The control output se of the comparison unit CU is connected not only to the client control output SE but also to the first input ii of the first multiplier MUL1, whose second input i2 is connected to the payload bit input PE of the modified sigma-delta modulator MSDM. In addition, the payload bit input PE of the modified sigma-delta modulator MSDM is connected to the comparison unit CU.

Analogously to the sigma-delta modulator SDM illustrated in FIG. 2, the clock of the server signal or the server clock signal tss is applied to the clock input TE of the modified sigma-delta modulator MSDM, and is transmitted to the memory unit MEM. Depending on the server clock signal tss, the signal value which is present at the fourth input i4 of the memory unit MEM is read to the memory unit MEM and is stored, provided the payload signal pls which is supplied via the payload area input PBE of the memory unit MEM is active.

Furthermore, the frame start signal rss, which is applied to the frame start input FSB, is used to tell the modified sigma-delta modulator MSDM when a, new frame R is starting within the server signal ss. The frame start signal rss is transmitted to the memory unit MEM for this purpose. In addition, the start of a server frame R in the server signal ss is indicated by the frame start signal rss to the modified sigma-delta modulator MSDM and, in consequence, a value W stored in the memory unit MEM is set to the value 0, that is to say the memory contents W are deleted.

The payload signal pls is applied to the payload area input PBE of the modified sigma-delta modulator MSDM, and is transmitted to the memory unit MEM and, furthermore, to the control input si of the comparison unit CU and to its extreme-value determination unit EU. The payload signal pls indicates the payload area PB within a server frame R of the server signal ss, that is to say when the payload area PB of the server signal ss is actually being transmitted, the payload signal pls is switched to be active. In addition, the payload signal pls starts an extreme-value determination procedure EWP in the extreme-value determination unit EU in the comparison unit CU.

The value W to be stored in the memory unit MEM is transmitted from the first adder ADD1 to the fourth input i4 of the memory unit MEM, where it is stored, using the clock for the server signal tss, during the transmission of the payload area PB. The value W is produced, for example in constant form, at the output e of the memory unit MEM, and is transmitted from there to the second input i2 of the second adder ADD2.

Furthermore, the identification number signal kzs which is applied to the identification number input CE, and hence the identification number KZ, are connected via the identification number input CE of the modified sigma-delta modulator MSDM to the input i of the second multiplier MUL2, are multiplied in the second multiplier MUL2 by the value n, that is to say by the number of bits to be processed in parallel, and are transmitted from the output e of the second multiplier MUL2 to the first input i1 of the second adder ADD2. The second adder ADD2 is used to add the identification number signal n*kzs or the identification number n*KZ, multiplied by n, and the value W from the memory unit MEM, and the addition result, combined in a first auxiliary signal hs1, is transmitted via the output e of the second adder ADD2 to the first input i1 of the first adder ADD1, and to the first to n-th inputs i1 to in of the comparison unit CU, with the first to the n-th comparison stages VS1 to VSn of the comparison unit CU being connected to the first to n-th inputs i1 to in.

In the comparison unit CU or in the first to n-th comparison stages VS1 to VSn, the first to n-th comparison procedures VP1 to VPn are used to compare the first auxiliary signal hs1, which is produced from the addition of the value W and the identification number n*KZ multiplied by n, with the value P transmitted from the payload input PE to the comparison unit CU, which indicates the number of bits in the payload area PB, and the first to n-th comparison result is transmitted to the extreme-value determination unit EU. In this case, the first auxiliary signal hs1 is compared with the single value P in the first comparison stage VS1, the first auxiliary signal hs1 is compared with the value P multiplied by the factor 2 in the second comparison stage VS2. This process is continued throughout all the comparison stages VS1 to VSn until, in the n-th comparison stage VSn, the first auxiliary signal hs1 is compared with the value P multiplied by the factor n. That is, for example, if the value of the first auxiliary signal hs1 is greater than or equal to the value P which indicates the number of bits in the payload area PB in the first comparison stage VS1, a comparison result whose value is 1 is transmitted to the extreme-value determination unit EU. Analogously to this, if the value P multiplied by the factor 2 is equal to or greater than the first auxiliary signal hs1 in the second comparison stage VS2, the comparison result with the value 2 is determined and is transmitted to the extreme-value determination unit EU. In the n-th comparison stage VSn, the comparison result with the value n is also transmitted to the extreme-value determination unit EU if the value P multiplied by the factor n is equal to or less than the value of the first auxiliary signal hs1. Furthermore, the following statement can be made for the first to n-th comparison stages VS1 to VSn: if the value of the first auxiliary signal hs1 is less than the respective multiple of the value P which indicates the number of bits in the payload area PB, then the value 0 is transmitted as the comparison result from the respective comparison stage VS1 to VSn to the extreme-value determination unit EU.

In the extreme-value determination unit EU, the extreme-value determination procedure EWP is used, for example, to determine the maximum of the comparison results transmitted from the first to the n-th comparison stages VS1 to VSn, and this is transmitted via the control output se as the client bit control signal cbs not only to the client control output SE but also to the first input i1 of the first multiplier MUL1.

The payload area signal pls which is supplied via the control input si is used to switch the extreme-value determination procedure EWP to be active. That is, a client bit control signal cbs is, thus, in each case formed in the comparison unit CU at that time at which the payload area PB of the server signal ss is actually being evaluated by the method according to the invention.

The product of the value P which is received at the second input i2 and indicates the number of bits in the payload area PB and of the client bit control signal cbs which is received at the first input i1 is formed in the first multiplier MUL1 and is transmitted via the output e of the first multiplier MUL1 to the second input e2 of the first adder ADD1, with the mathematical sign of the product being inverted at the second input i2 of the first adder ADD1. Specifically, a product with a negative mathematical sign is assigned a positive mathematical sign, and a product with a positive mathematical sign is assigned a negative mathematical sign.

The sum of the first auxiliary signal hs1, which is applied to the first input i1, and the product, which is applied to the second input i2, of the value P which indicates the number of bits in the payload area PB and the client bit control signal cbs is formed in the first adder ADD1, and is transmitted via the output e of the first adder ADD1 to the fourth input i4 of the memory unit MEM.

According to the modified sigma-delta modulator MSDM illustrated in FIG. 5, the identification number signal multiplied by n or the identification number n*kzs is added, by the second adder ADD2, to the memory content W of the memory unit MEM at the time of the n-bit parallel data processing. In the comparison unit CU, the first to the n-th comparison stages VS1 to VSn and the first to the n-th comparison procedures VP1 to VPn implemented in them are, furthermore, used to determine whether the number of payload bits P, or the first to n-th multiple of the number of payload bits P, is less than or equal to the value of the first auxiliary signal hs1 or of the first auxiliary signal value hs1. If this is the case, then the respective first to n-th comparison results are transmitted to the extreme-value determination unit EU, and the extreme-value determination procedure EWP is used to determine or form the client bit control signal cbs, by transmitting the client data signal cds in groups of n bits to the n-bit positions under consideration. The number of the product (which is subtracted from the first auxiliary signal hs1 or from the first auxiliary signal value hs1 using the first adder ADD1) of the number of payload bits P and the client control bit signal cbs is defined by the client bit control signal cbs determined in the extreme-value determination unit EU. The value of the subtraction, or the result, is transmitted as the second auxiliary signal hs2, or the second auxiliary signal value hs2, from the output e of the first adder ADD1 to the fourth input i4 of the memory unit MEM, where it is stored as the new memory value W.

In addition, in the comparison unit CU, the client bit control signal cps is transmitted to the client control output SE using the comparison unit VU. The client bit control signal cps indicates to the buffer memory units PS1, PS2 which are respectively arranged in the first and second transmission units UE1, UE2 that one or more client bits will be transmitted in the n-bit area of the payload area PB under consideration. In this case, the value of the client bit control signal cps indicates the number of client bits to be transmitted within the n-bit area under consideration. Furthermore, bit shifters, for example barrel shifters, can be provided, in the first and second buffer memory units PS1, PS2, and can be used to read or write the corresponding number of client bits. These bit shifters which are arranged in the first and second buffer memory units PS1, PS2 are controlled with the aid of the client bit control signal cps.

In addition, an inactive client bit control signal cps is produced in the comparison unit CU using the first to n-th comparison procedures VP1 to VPn and the extreme-value determination procedure EWP. This indicates that no client bits will be transmitted to the n-bit-parallel payload bit area under consideration in the payload area PB. In this case, the inactive client bit control signal cps has the logic value 0. This value is otherwise also assumed by the client bit control signal cps outside the payload area PB.

The modified sigma-delta modulator MSDM according to the present invention is used to distribute the identification numbers KZ and the number of client bits C which can be transmitted in the payload area PB of the server signal ss uniformly over the payload area PB. This also improves the jitter/wandering behavior of the transmission system for n-bit-parallel data processing, and the memory capacity of the buffer memory which needs to be provided within the transmission system is advantageously reduced. The sigma-delta modulator MSDM modified according to the present invention is thus operated using the clock rate, for example of the server signal ss, divided by n.

The rounding error which occurs in the identification number KZ in each server frame R can, in particular, be reduced by additionally transmitting the missing number of bits (C-integer part (C/n)*n). The missing bits from the client signal can be additionally transmitted, for example, at a bit position in the payload area of the server frame R which is specifically defined or reserved for this purpose, with the number of payload bits available for the method according to the present invention accordingly being reduced for this purpose.

Although the present invention has been described with reference to specific embodiments, those of skill in the art will recognize that changes may be made thereto without departing from the spirit and scope of the invention as set forth in the hereafter appended claims.

I claim as my invention:

1. A method for transmitting at least one client signal which has a first transmission bit rate within a server signal which has a predetermined second transmission bit rate, wherein the first and second transmission bit rates are different, the method comprising the steps of:
    determining for at least one client signal, at a transmission end, at least one identification number which indicates a relationship between the first and second transmission bit rates;
    inserting, uniformly, data in the at least one client signal into the server signal via sigma-delta modulation and using the determined identification number;
    transmitting the server signal with the determined identification number; and
    determining, at a receiving end, the data in the at least one client signal from the transmitted server signal via sigma-delta modulation and the transmitted identification number.

2. A method for transmitting at least one client signal within a server signal as claimed in claim 1, wherein the server signal has a frame structure, with each server frame being subdivided into an overhead area and a payload area.

3. A method for transmitting at least one client signal within a server signal as claimed in claim 2, wherein the determined identification number is transmitted into the overhead area of the server signal.

4. A method for transmitting at least one client signal within a server signal as claimed in claim 2, wherein a number of data items in the client signal which are distributed within the server signal is defined by the identification number.

5. A method for transmitting at least one client signal within a server signal as claimed in claim 2, wherein the determined identification number is used as numerator, and a data-format-specific size of the payload area of the server signal is used as denominator for the sigma-delta modulation.

6. A method for transmitting at least one client signal within a server signal as claimed in claim 2, wherein, at the transmission end, the sigma-delta modulation is used to determine a payload area position of respective data items in the client signal to be transmitted within the server signal, and a data item in the client signal is inserted into the server signal at the determined payload area position.

7. A method for transmitting at least one client signal within a server signal as claimed in claim 2, wherein, at the receiving end, both the sigma-delta modulation and the identification number transmitted therewith are used to determine payload area positions of data items in the client signal which are transmitted within the server signal, and a data item in the client signal is read from the server signal at the determined payload area position.

8. A method for transmitting at least one client signal within a server signal as claimed in claim 2, wherein, in order to transmit a plurality of client signals, which are at different bit rates, using the one server signal, each client signal is assigned at least one section of the payload area of the server signal.

9. A method for transmitting at least one client signal within a server signal as claimed in claim 8, wherein, when transmitting the plurality of client signals which are at different bit rates, an identification number is determined and transmitted for each client signal.

10. A method for transmitting at least one client signal within a server signal as claimed in claim 8, wherein, when transmitting the plurality of client signals which are at different bit rates, sigma-delta modulation is respectively carried out for each client signal.

11. A method for transmitting at least one client signal within a server signal as claimed in claim 1, wherein the identification number is protected by a security mechanism.

12. A method for transmitting at least one client signal within a server signal as claimed in claim 1, wherein the data in the at least one client signal is transmitted in one of bits and groups of bits within the payload area of the server signal.

13. A system for transmitting at least one client signal which has a first transmission bit rate within a server signal which has a predetermined second transmission bit rate, wherein the first and second transmission bit rates are different, the system comprising:
   an identification number determination unit provided in a first transmission unit for determining at least one identification number, which indicates a relationship between the first and second transmission bit rates, for at least one client signal;
   a first sigma-delta modulator provided in the first transmission unit for determining an insertion control signal from the determined identification number, for virtually uniform insertion of data in the at least one client signal into the server signal;
   an identification number insertion unit for inserting the identification number into the server signal;
   a transmitter provided in the first transmission unit for transmitting the server signal and the determined identification number to at least one second transmission unit;
   an identification number removal unit provided in the second transmission unit for removing the identification number from the transmitted server signal; and
   a second sigma-delta modulator for determining a removal control signal based on the transmitted identification number for removing the data in the at least one client signal from the transmitted server signal.

14. A system for transmitting at least one client signal within a server signal as claimed in claim 13, further comprising:
   a first and a second frame counter unit provided in the first and second transmission units, respectively, for determining a frame start signal and a payload area signal, respectively, based on the server clock signal.

15. A system for transmitting at least one client signal within a server signal as claimed in claim 13, further comprising:
   a client clock determination unit provided in the second transmission unit for determining a client clock signal at least based on the transmitted identification number and the server clock signal.

16. A system for transmitting at least one client signal within a server signal as claimed in claim 15, further comprising:
   at least one first buffer memory and one second buffer memory for storing the client signal and the server signal, respectively, the at least one first buffer memory and at least one second buffer memory provided in the first and the second transmission units, respectively, wherein a current filling level of the first and second buffer memories in the identification number determination unit and the client clock determination unit, respectively, are indicated.

* * * * *